United States Patent
Sato

(10) Patent No.: US 9,359,495 B2
(45) Date of Patent: Jun. 7, 2016

(54) RUBBER COMPOSITION FOR HEAT RESISTANT CONVEYOR BELTS, AND HEAT-RESISTANT CONVEYOR BELT

(71) Applicant: The Yokohama Rubber Co., LTD., Minato-ku, Tokyo (JP)

(72) Inventor: Aya Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/764,270

(22) PCT Filed: Jan. 29, 2014

(86) PCT No.: PCT/JP2014/051991
§ 371 (c)(1),
(2) Date: Jul. 29, 2015

(87) PCT Pub. No.: WO2014/119625
PCT Pub. Date: Aug. 7, 2014

(65) Prior Publication Data
US 2015/0368450 A1 Dec. 24, 2015

(30) Foreign Application Priority Data

Jan. 29, 2013 (JP) ................................. 2013-014149

(51) Int. Cl.
*B65G 15/30* (2006.01)
*C08L 23/16* (2006.01)
(Continued)

(52) U.S. Cl.
CPC ................. *C08L 23/16* (2013.01); *B65G 15/32* (2013.01); *C08L 23/0815* (2013.01); *B29D 29/06* (2013.01); *B65G 2207/22* (2013.01); *C08L 2201/02* (2013.01); *C08L 2205/02* (2013.01)

(58) Field of Classification Search
CPC ........ B65G 15/34; B65G 15/38; C08L 23/16; C08L 23/085; C08L 2201/02
USPC .................................... 198/846, 847; 525/232
See application file for complete search history.

(56) References Cited

U.S. PATENT DOCUMENTS 2,875,116 A * 2/1959 Smith .................... B29D 29/06
198/847
4,469,729 A * 9/1984 Watanabe ................ C08J 5/124
138/118

(Continued)

FOREIGN PATENT DOCUMENTS

CN            101855290        10/2010
JP              S62-205910         9/1987

(Continued)

OTHER PUBLICATIONS

International Search Report for International Application No. PCT/JP2014/051991 dated Apr. 15, 2014, 4 pages, Japan.

*Primary Examiner* — James R Bidwell
(74) *Attorney, Agent, or Firm* — Thorpe North & Western

(57) ABSTRACT

A rubber composition for heat-resistant conveyor belts according to the present technology contains an ethylene-butene copolymer and an ethylene-propylene-diene copolymer. The mass ratio of the ethylene-butene copolymer to the ethylene-propylene-diene copolymer [(ethylene-butene copolymer)/(ethylene-propylene-diene copolymer)] is from 5/95 to 95/5; and the amount of diene units in the ethylene-propylene-diene copolymer is 2.0% by mass or less per 100 parts by mass of the total of the ethylene-butene copolymer and the ethylene-propylene-diene copolymer.

8 Claims, 2 Drawing Sheets

(51) Int. Cl.
*B65G 15/32* (2006.01)
*C08L 23/08* (2006.01)
*B29D 29/06* (2006.01)

(56) References Cited

U.S. PATENT DOCUMENTS

| | | | | |
|---|---|---|---|---|
| 4,637,511 | A * | 1/1987 | Johnson | B65G 15/32 139/425 R |
| 7,267,219 | B2 * | 9/2007 | Vogt | F16G 3/10 198/844.1 |
| 2007/0244263 | A1 | 10/2007 | Burrowes | |
| 2008/0269385 | A1 * | 10/2008 | Alexander | B32B 25/14 524/147 |
| 2010/0240809 | A1 | 9/2010 | Yamada | |

FOREIGN PATENT DOCUMENTS

| | | |
|---|---|---|
| JP | H11-292236 | 10/1999 |
| JP | 3911840 | 5/2007 |
| JP | 3951415 | 8/2007 |
| JP | 2007-284677 | 11/2007 |
| JP | 2010-248401 | 11/2010 |
| JP | 2011-178917 | 9/2011 |
| WO | WO 2009/060748 | 5/2009 |

* cited by examiner

RUBBER COMPOSITION FOR HEAT RESISTANT CONVEYOR BELTS, AND HEAT-RESISTANT CONVEYOR BELT

TECHNICAL FIELD

The present technology relates to a rubber composition for heat-resistant conveyor belts and a heat-resistant conveyor belt.

BACKGROUND

Conventionally, rubber compositions containing an ethylene-α-olefin copolymer, and heat-resistant belts using a rubber composition containing an ethylene-α-olefin copolymer and an ethylene-α-olefin-diene copolymer have been proposed (e.g. refer to Japanese Patent Nos. 3951415B and 3911840B, and also Japanese Unexamined Patent Application Publication Nos. H11-292236A and 562-205910A).

As raw materials for these heat-resistant belts, EPM (ethylene-propylene copolymer) exhibits low productivity, and supply of EPDM (ethylene-propylene-diene copolymer) has been unstable since demands for EPDM increases when the market is active and exceeds the supply thereof.

However, heat-resistant belts obtained by using a rubber composition containing an ethylene-α-olefin copolymer exhibit poor physical properties, such as low elongation at break (EB) in a normal state, low elongation at break (EB) after aging, and low tensile strength (TB).

Furthermore, rubber compositions for heat-resistant conveyor belts that can replace conventional raw materials are needed from the perspective of supply conditions of EPDM. The rubber composition for heat-resistant conveyor belts that replaces conventional products is desired to exhibit the same or superior heat resistance and processability compared to conventional products.

SUMMARY

The present technology provides a rubber composition for heat-resistant conveyor belts, which exhibits high physical properties, while at least maintaining heat resistance and processability.

A rubber composition for heat-resistant conveyor belts, which exhibits high physical properties, while at least maintaining heat resistance and processability, is achieved by a composition comprising: an ethylene-butene copolymer and an ethylene-propylene-diene copolymer; a mass ratio of the ethylene-butene copolymer to the ethylene-propylene-diene copolymer [(ethylene-butene copolymer)/(ethylene-propylene-diene copolymer)] being from 5/95 to 95/5; and an amount of diene units in the ethylene-propylene-diene copolymer being 2.0% by mass or less per 100 parts by mass of a total of the ethylene-butene copolymer and the ethylene-propylene-diene copolymer; and thus completed the present technology.

Specifically, the present technology provides the following 1 to 4.

1. Rubber composition for heat-resistant conveyor belts, the rubber composition comprising: an ethylene-butene copolymer and an ethylene-propylene-diene copolymer; a mass ratio of the ethylene-butene copolymer to the ethylene-propylene-diene copolymer [(ethylene-butene copolymer)/(ethylene-propylene-diene copolymer)] being from 5/95 to 95/5; and an amount of diene units in the ethylene-propylene-diene copolymer being 2.0% by mass or less per 100 parts by mass of a total of the ethylene-butene copolymer and the ethylene-propylene-diene copolymer.

2. The rubber composition for heat-resistant conveyor belts according to 1 above, wherein a melting point of the ethylene-butene copolymer is 40° C. or lower.

3. The rubber composition for heat-resistant conveyor belts according to 1 or 2 above, wherein a density (23° C.) of the ethylene-butene copolymer is from 0.83 to 0.88 g/cm$^3$.

4. A heat-resistant conveyor belt comprising the rubber composition for heat-resistant conveyor belts described in any one of 1 to 3 above.

The rubber composition for heat-resistant conveyor belts of the present technology can be formed into a heat-resistant conveyor belt, which exhibits high physical properties, while at least maintaining heat resistance and processability. The heat-resistant conveyor belt of the present technology exhibits high physical properties, while at least maintaining heat resistance and processability.

DETAILED DESCRIPTION

Figure 1:
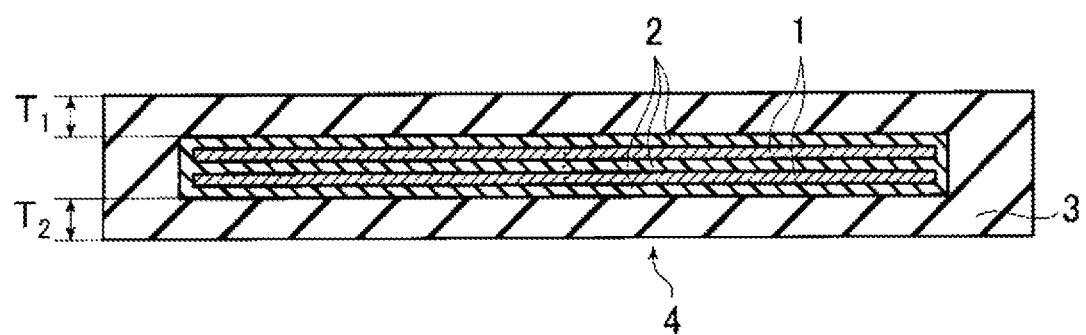
FIG. 1 is a cross-sectional view schematically illustrating an embodiment of the heat-resistant conveyor belt of the present technology.

The rubber composition for heat-resistant conveyor belts of the present technology is described below.

The rubber composition for heat-resistant conveyor belts of the present technology (hereinafter, also referred to as "rubber composition of the present technology") contains an ethylene-butene copolymer and an ethylene-propylene-diene copolymer. The mass ratio of the ethylene-butene copolymer to the ethylene-propylene-diene copolymer [(ethylene-butene copolymer)/(ethylene-propylene-diene copolymer)] is from 5/95 to 95/5; and the amount of diene units in the ethylene-propylene-diene copolymer is 2.0% by mass or less per 100 parts by mass of the total of the ethylene-butene copolymer and the ethylene-propylene-diene copolymer.

The ethylene-butene copolymer is described below. The ethylene-butene copolymer contained in the rubber composition of the present technology is not particularly limited as long as the ethylene-butene copolymer is a copolymer of ethylene and butene.

The melting point of the ethylene-butene copolymer is preferably 40° C. or lower, and more preferably from 35 to 40° C., from the perspective of excellent processability particularly at ambient temperature. When the melting point of the ethylene-butene copolymer is within this range, the rubber composition of the present technology exhibits higher physical properties and excellent elongation at break while maintaining heat aging resistance. It is conceived that this is because the ethylene-butene copolymer tends less to be crystallized during elongation if the melting point is 40° C. or lower while the crystallization rapidly proceeds during the elongation if the melting point is higher than 40° C.

Furthermore, the melting point of the ethylene-butene copolymer is preferably 30° C. or higher, and more preferably 35° C. or higher, because the normal physical properties (tensile strength (TB)) of the rubber composition of the present technology will be better while the intermolecular cohesive energy is prevented from becoming too small.

The density (23° C.) of the ethylene-butene copolymer is preferably from 0.83 to 0.88 g/cm³, and more preferably from 0.85 to 0.87 g/cm³ from the perspective of maintaining heat resistance and physical properties and exhibiting excellent processability. When the density of the ethylene-butene copolymer is within this range, the rubber composition of the present technology exhibits higher physical properties and excellent elongation at break while maintaining heat aging resistance. It is conceived that this is because the ethylene-butene copolymer tends less to be crystallized during elongation if the density is 0.88 g/cm³ or less due to the large content of butene while the crystallization tends to rapidly proceed during the elongation if the density is greater than 0.88 g/cm³ due to the large content of ethylene.

The method of producing the ethylene-butene copolymer is not particularly limited. Examples thereof include conventionally known methods.

The ethylene-butene copolymer may be used alone or as a mixture of two or more types.

The ethylene-propylene-diene copolymer is described below.

The ethylene-propylene-diene copolymer contained in the rubber composition of the present technology is not particularly limited as long as the ethylene-propylene-diene copolymer is a copolymer of ethylene, propylene, and diene.

The amount of the ethylene units (repeating units of ethylene) contained in the ethylene-propylene-diene copolymer is preferably from 40 to 70% by mass, and more preferably from 45 to 60% by mass, of the ethylene-propylene-diene copolymer from the perspective of exhibiting excellent heat resistance and processability, achieving higher physical properties, and, in particular, exhibiting excellent rolling processability and moldability.

Diene used in the production of the ethylene-propylene-diene copolymer is exemplified by non-conjugated diene compounds. Specific examples of the non-conjugated diene compound include dicyclopentadiene (DCPD), 5-ethylidene-2-norbornene (ENB), and 1,4-hexadiene (HD).

The method of producing the ethylene-propylene-diene copolymer is not particularly limited. Examples thereof include conventionally known methods.

The ethylene-propylene-diene copolymer may be used alone or as a mixture of two or more types.

In the present technology, the mass ratio of the ethylene-butene copolymer to the ethylene-propylene-diene copolymer [(ethylene-butene copolymer)/(ethylene-propylene-diene copolymer)] is from 5/95 to 95/5. When the mass ratio is within the range described above, excellent heat resistance and processability as well as high physical properties can be achieved.

Furthermore, the mass ratio of the ethylene-butene copolymer to the ethylene-propylene-diene copolymer is preferably from 40/60 to 90/10, and more preferably from 50/50 to 70/30, from the perspectives of exhibiting excellent heat resistance and processability as well as achieving high physical properties.

In the present technology, the amount of diene units (repeating units of diene) contained in the ethylene-propylene-diene copolymer is 2.0% by mass or less per 100 parts by mass of the total of the ethylene-butene copolymer and the ethylene-propylene-diene copolymer. The amount of the diene units contained in the ethylene-propylene-diene copolymer is preferably 0.1% by mass or greater but 1.5% by mass or less per 100 parts by mass of the total of the ethylene-butene copolymer and the ethylene-propylene-diene copolymer from the perspective of exhibiting excellent heat resistance and processability, achieving higher physical properties, and, in particular, exhibiting excellent heat resistance.

In addition to the components described above, the rubber composition of the present technology may contain additives that are typically used in rubber compositions, such as fillers (e.g. carbon black), zinc oxide, stearic acid, anti-aging agent, oil, plasticizer, softener, and cross-linking agent, in the range that does not impair the object of the present technology. The content of the additive may be appropriately selected in the range that does not impair the object of the present technology.

The production of the rubber composition of the present technology can be performed by, for example, publicly known conditions and methods. Specifically, for example, the rubber composition of the present technology can be produced by mixing an ethylene-butene copolymer and an ethylene-propylene-diene copolymer, and an additive that may be optionally contained, using a Banbury mixer, kneader, roll, or the like.

Use of the rubber composition of the present technology is exemplified by conveyor belts. In addition to conveyor belts, the rubber composition of the present technology can be also used in applications in which a rubber composition that typically contains EPDM can be applied; and such applications include, for example, a transmission belt, hose, roll, outer hood, and the like.

The heat-resistant conveyor belt of the present technology is now described below.

The heat-resistant conveyor belt of the present technology is a heat-resistant conveyor belt using the rubber composition of the present technology. The heat-resistant conveyor belt of the present technology is not particularly limited as long as it is a heat-resistant conveyor belt that is produced by using the rubber composition of the present technology. For example, the shape, production method, and the like can be the same as those for publicly known heat-resistant conveyor belts.

The heat-resistant conveyor belt of the present technology is exemplified by a heat-resistant conveyor belt having at least a core material (e.g. canvas, steel cord) and a cover rubber formed by using the rubber composition of the present technology.

The heat-resistant conveyor belt of the present technology is described below using attached drawings. However, the present technology is not limited to the attached drawings.

FIG. 1 is a cross-sectional view schematically illustrating an embodiment (first embodiment) of the heat-resistant conveyor belt of the present technology. As illustrated in FIG. 1, the heat-resistant conveyor belt 4 of the present technology is a heat-resistant conveyor belt that is formed by covering core materials 1 with a coating rubber (adhesive rubber) 2 to form a core material layer (not illustrated) and covering the periphery of the core material layer with a cover rubber 3. The rubber composition of the present technology can be used in the cover rubber and/or the coating rubber. The number of laminated layers of the core material 1, the thickness and/or the belt width of the cover rubber 3, or the like is appropriately selected depending on the intended use; however, typically the thicknesses $T_1$ and $T_2$ of the cover rubber 3 are approximately from 1.5 to 20 mm.

Examples of the core material used in the heat-resistant conveyor belt of the present technology is woven fabric (canvas) of synthetic fibers such as nylon, vinylon, and polyester.

The coating rubber used in the heat-resistant conveyor belt of the present technology may be a coating rubber used in publicly known heat-resistant conveyor belts. Examples thereof include rubber compositions containing, as the rubber component, natural rubber (NR), acrylonitrile butadiene rubber (NBR), styrene-butadiene rubber (SBR), butadiene rubber (BR), or the like.

Figure 2:
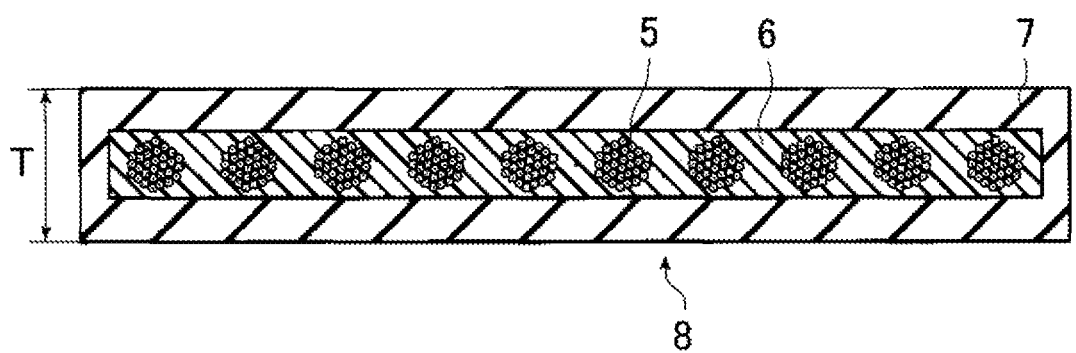
FIG. 2 is a cross-sectional view schematically illustrating another embodiment of the heat-resistant conveyor belt of the present technology.

Next, the second embodiment of the heat-resistant conveyor belt of the present technology is described using FIG. 2. FIG. 2 is a cross-sectional view schematically illustrating another embodiment (second embodiment) of the heat-resistant conveyor belt of the present technology.

As illustrated in FIG. 2, the heat-resistant conveyor belt 8 of the present technology is a heat-resistant conveyor belt that is formed by covering a steel cord 5 with a cushioning rubber (adhesive rubber) 6 to form a core material layer and covering the periphery of the core material layer with a cover rubber 7. The rubber composition of the present technology can be used in the cover rubber and/or the cushioning rubber.

The heat-resistant conveyor belt 8 of FIG. 2 has core materials which are formed by arranging approximately 50 to 230 steel cords 5 in parallel. The steel cord 5 is formed by twisting a plurality of wire strands having diameters of approximately 0.2 to 0.4 mm to form a wire rope having a diameter of approximately 2.0 to 9.5 mm. Typically, the total thickness T of the heat-resistant conveyor belt 8 is approximately from 10 to 50 mm.

Furthermore, the cushioning rubber may be, for example, an adhesive rubber that can be adhered to zinc-plated steel cord and that is used in publicly known steel conveyor belts. Specifically, rubber compositions containing, as the rubber component, natural rubber (NR), acrylonitrile butadiene rubber (NBR), styrene-butadiene rubber (SBR), butadiene rubber (BR), or the like can be used.

A method of producing the heat-resistant conveyor belt of the present technology is not particularly limited. For example, the heat-resistant conveyor belt can be easily produced by arranging a core material layer, which is obtained by covering canvas or a steel cord that becomes a core material or a core material with a coating rubber or a cushioning rubber in accordance with conventional method, in between unvulcanized rubber sheets that are formed by the rubber composition of the present technology, and then vulcanizing by press-heating. Note that the vulcanization condition is typically at approximately 120 to 180° C. under approximately 0.1 to 4.9 MPa for approximately 10 to 90 minutes.

Since the heat-resistant conveyor belt of the present technology uses the rubber composition of the present technology, the heat-resistant conveyor belt exhibits high physical properties while at least maintaining heat resistance and processability (e.g. high elongation at break in a normal state, high elongation at break after aging, and high tensile strength; and excellent heat aging resistance).

Since the heat-resistant conveyor belt of the present technology has excellent weatherability and ozone resistance, the heat-resistant conveyor belt is suitable for outdoor use for a long period of time.

The heat-resistant conveyor belt of the present technology can be a belt with a smooth surface since the rubber composition for heat-resistant conveyor belts of the present technology that is used for the heat-resistant conveyor belt is excellent in processability.

EXAMPLES

The rubber composition of the present technology is further described below using examples. However, the present technology is not limited to these examples.

<Production of Rubber Composition for Heat-Resistant Conveyor Belts>

Each composition was obtained by mixing and dispersing the components described in Table 1 below at the composition (part by mass) described in the same table using a Banbury mixer.

<Production of Vulcanized Rubber of Rubber Composition for Heat-Resistant Conveyor Belts>

The rubber composition obtained as described above was formed into an unvulcanized rubber sheet having a thickness of 10 mm using an open roll. Thereafter, the obtained unvulcanized rubber sheet was vulcanized by heating at 160° C. for 45 minutes using a press to produce a vulcanized rubber.

<Evaluation>

Using the rubber composition and the vulcanized rubber obtained as described above, physical properties in normal state, physical properties after aging, difference between the physical properties in normal state and after aging, wear resistance, and processability were evaluated by test methods described below. The results are shown in Table 1.

<Physical Properties in Normal State>

For each vulcanized rubber of the examples, hardness (Hs), tensile strength (TB), and elongation at break (EB) were measured according to the methods described below.

Hardness (Hs): Hardness at 23° C. was measured using a type-A spring-type hardness tester in accordance with JIS (Japanese Industrial Standard) K6253:1997.

For the case where the Hs in normal state was 65 or greater but 80 or less, the Hs in normal state was excellent, and such a case was described as "A". Hs in other cases were considered to be poor, and such cases were described as "B".

Tensile strength (TB) [MPa]: Tensile strength was measured using a sample that was obtained by punching out a 2 mm sheet with No. 3 dumbbell, at a pulling speed of 500 mm/min in accordance with JIS K6251:2004.

For the case where the TB in normal state was 13.0 MPa or greater, the TB in normal state was excellent, and such a case was described as "A". TB in other cases were considered to be poor, and such cases were described as "B".

Elongation at break (EB) [%]: Elongation at break was measured using a sample that was obtained by punching out a 2 mm sheet with No. 3 dumbbell, at a pulling speed of 500 mm/min in accordance with JIS K6251:2004.

For the case where the EB in normal state was 500% or greater, the EB in normal state was excellent, and such a case was described as "A". EB in other cases were considered to be poor, and such cases were described as "B".

<Physical Properties after Aging>

After performing heat aging resistance test at 180° C. for 168 hours, hardness (Hs), tensile strength (TB), and elongation at break (EB) were measured for each vulcanized rubber of the examples, according to the same methods as the methods for measuring the physical properties in normal state [hardness (Hs), tensile strength (TB), and elongation at break (EB)] described above. Evaluation criteria are shown below.

Hardness (Hs)

For the case where the Hs after the heat aging resistance test was 70 or greater but 85 or less, the Hs after the heat aging resistance test was excellent, and such a case was described as "A". Hs in other cases were considered to be poor, and such cases were described as "B".

Tensile strength (TB) [MPa]

For the case where the TB after the heat aging resistance test was 11.0 MPa or greater, the TB after the heat aging resistance test was excellent, and such a case was described as "A". TB in other cases were considered to be poor, and such cases were described as "B".

Elongation at break (EB) [%]

For the case where the EB after the heat aging resistance test was 350% or greater, the EB after the heat aging resistance test was excellent, and such a case was described as "A". EB in other cases were considered to be poor, and such cases were described as "B".

<Difference Between Physical Properties in Normal State and after Aging>

Change in hardness (ΔHs, point), rate of change in tensile strength (ΔTB, %), and rate of change in elongation at break (ΔEB, %) were determined before and after the heat aging resistance test at 180° C. for 168 hours.

ΔHs

Change in hardness was calculated from the formula below.

Change in hardness (ΔHs, point)=Hs before heat aging resistance test (Hs of physical properties in normal state)−Hs after heat aging resistance test ΔHs is described as an absolute value.

For the case where the change (ΔHs described above) between hardness in normal state (Hs of physical properties in normal state) and hardness after the heat aging resistance test was 8 points or less, the ΔHs was small and thus heat resistance was excellent, and such a case was described as "A". ΔHs in other cases were large and thus heat resistance was poor, and such cases were described as "B".

When the Hs after the heat aging resistance test was 70 or greater but 85 or less and the change between Hs in normal state and the Hs after the heat aging resistance test (ΔHs described above) was 8 points or less, the Hs after the aging was considered to be excellent.

ΔTB (%)

Rate of change in tensile strength was calculated from the formula below.

Rate of change in tensile strength (ΔTB, %)={[(TB before heat aging resistance test (TB of physical properties in normal state)−TB after heat aging resistance test)]/TB before heat aging resistance test (TB of physical properties in normal state)}×100

For the case where the rate of change (ΔTB described above) between tensile strength in normal state (TB of physical properties in normal state) and tensile strength after the heat aging resistance test was 30% or less, the ΔTB was small and thus heat resistance was excellent, and such a case was described as "A". ΔTB in other cases were large and thus heat resistance was poor, and such cases were described as "B".

When the TB after the heat aging resistance test was 11.0 MPa or greater and the rate of change between TB in normal state and the TB after the heat aging resistance test (ΔTB described above) was 30% or less, the TB after the aging was considered to be excellent.

ΔEB (%)

Rate of change in elongation at break was calculated from the formula below.

Rate of change in elongation at break (ΔEB, %)={[(EB before heat aging resistance test (EB of physical properties in normal state)−EB after heat aging resistance test)]/EB before heat aging resistance test (EB of physical properties in normal state)}×100

For the case where the rate of change (ΔEB described above) between elongation at break in normal state and elongation at break after the heat aging resistance test was 30% or less, the ΔEB was small and thus heat resistance was excellent, and such a case was described as "A". ΔEB in other cases were large and thus heat resistance was poor, and such cases were described as "B".

When the EB after the heat aging resistance test was 350% or greater and the rate of change between EB in normal state and EB after the heat aging resistance test (ΔEB described above) was 30% or less, the EB after the aging was considered to be excellent.

<Wear Resistance (DIN Wear)>

Before and after performing heat aging resistance test at 180° C. for 168 hours, amount of wear [$mm^3$] for each vulcanized rubber of the examples was measured by performing a wear test at room temperature using a DIN wear test machine, in accordance with JIS K6264:2005. Smaller wear amount indicated better wear resistance.

When the wear amount in normal state was 110 $mm^3$ or less, the wear resistance in normal state was considered to be excellent. Cases where the wear amount in normal state was 110 $mm^3$ or less were described as "A". Other cases exhibited poor wear resistance, and such cases were described as "B".

When the wear amount after the heat aging resistance test was 120 $mm^3$ or less, the wear resistance after the aging was considered to be excellent. Cases where the wear amount after the heat aging resistance test was 120 $mm^3$ or less were described as "A". Other cases exhibited poor wear resistance, and such cases were described as "B".

<Processability>

Each of the rubber composition of the examples was extruded by an extruder using a Garvey die as a die, at 60 rpm and at 80° C. Texture of the extruded surface was observed. Evaluation of the texture of the extruded surface was performed using scoring method B of ASTM-A method. The case where "edge" was evaluated as 7 points or greater and "texture" was evaluated as "A" or "B" was evaluated as "excellent". The case where "edge" was evaluated as 4 to 6 points and "texture" was evaluated as "C" was evaluated as "good". The case where "edge" was evaluated as 3 points or less and "texture" was evaluated as "D" or "E" was evaluated as "poor".

TABLE 1

| | Working Examples | | | | | |
|---|---|---|---|---|---|---|
| | 1 | 2 | 3 | 4 | 5 | 6 |
| EBM 1 (melting point: 37° C.) | 75 | 50 | 95 | 90 | 70 | 60 |
| EOM (melting point: 55° C.) | | | | | | |
| EPM 1 (ethylene content: 51.0% by mass) | | | | | | |
| EPM 2 (ethylene content: 54.5% by mass) | | | | | | |
| EPM 3 (ethylene content: 65.0% by mass) | | | | | | |
| EPDM 1 (diene content: 0.8% by mass) | 25 | 50 | | | | |
| EPDM 2 (diene content: 9.5% by mass) | | | 5 | 10 | | |
| EPDM 3 (diene content: 4.3% by mass) | | | | | 30 | 40 |
| Diene amount in rubber (wt. %) | 0.2 | 0.4 | 0.5 | 1.0 | 1.3 | 1.7 |
| Carbon black | 50.0 | ← | ← | ← | ← | ← |
| Zinc oxide | 5.0 | ← | ← | ← | ← | ← |
| Stearic acid | 1.0 | ← | ← | ← | ← | ← |
| Antiaging agent | 9.0 | ← | ← | ← | ← | ← |
| Oil | 1.2 | ← | ← | ← | ← | ← |

TABLE 1-continued

| | | | | | | | |
|---|---|---|---|---|---|---|---|
| Softener | | 15.0 | ← | ← | ← | ← | ← |
| Crosslinking agent | | 8.0 | ← | ← | ← | ← | ← |
| Physical properties in normal state | Hs | A | A | A | A | A | A |
| | TB | A | A | A | A | A | A |
| | EB | A | A | A | A | A | A |
| Physical properties after aging | Hs | A | A | A | A | A | A |
| (after 180° C. × 168 hr) | TB | A | A | A | A | A | A |
| | EB | A | A | A | A | A | A |
| Difference between physical | ΔHs | A | A | A | A | A | A |
| properties in normal state and after | ΔTB | A | A | A | A | A | A |
| aging (after 180° C. × 168 hr) | ΔEB | A | A | A | A | A | A |
| Wear resistance (before heat aging resistance test) | | A | A | A | A | A | A |
| Wear resistance after 180° C. × 168 hr | | A | A | A | A | A | A |
| Workability | | Good | Excellent | Good | Good | Good | Good |

| | | Comparative Examples | | | | |
|---|---|---|---|---|---|---|
| | | 1 | 2 | 3 | 4 | 5 |
| EBM 1 (melting point: 37° C.) | | 100 | | | | |
| EOM (melting point: 55° C.) | | | 100 | 80 | 20 | |
| EPM 1 (ethylene content: 51.0% by mass) | | | | | | 100 |
| EPM 2 (ethylene content: 54.5% by mass) | | | | | | |
| EPM 3 (ethylene content: 65.0% by mass) | | | | 20 | 80 | |
| EPDM 1 (diene content: 0.8% by mass) | | | | | | |
| EPDM 2 (diene content: 9.5% by mass) | | | | | | |
| EPDM 3 (diene content: 4.3% by mass) | | | | | | |
| Diene amount in rubber (wt. %) | | 0 | 0 | 0 | 0 | 0 |
| Carbon black | | 50.0 | ← | ← | ← | ← |
| Zinc oxide | | 5.0 | ← | ← | ← | ← |
| Stearic acid | | 1.0 | ← | ← | ← | ← |
| Antiaging agent | | 9.0 | ← | ← | ← | ← |
| Oil | | 1.2 | ← | ← | ← | ← |
| Softener | | 15.0 | ← | ← | ← | ← |
| Crosslinking agent | | 8.0 | ← | ← | ← | ← |
| Physical properties in normal state | Hs | A | B | B | B | A |
| | TB | A | A | A | A | A |
| | EB | A | A | A | A | A |
| Physical properties after aging | Hs | A | B | B | B | A |
| (after 180° C. × 168 hr) | TB | A | A | A | A | B |
| | EB | A | A | A | A | A |
| Difference between physical | ΔHs | A | A | A | A | A |
| properties in normal state and after | ΔTB | A | A | A | B | B |
| aging (after 180° C. × 168 hr) | ΔEB | A | A | A | B | B |
| Wear resistance (before heat aging resistance test) | | A | A | A | A | A |
| Wear resistance after 180° C. × 168 hr | | A | A | A | A | A |
| Workability | | Poor | Poor | Poor | Excellent | Excellent |

| | | Comparative Examples | | | | |
|---|---|---|---|---|---|---|
| | | 6 | 7 | 8 | 9 | 10 |
| EBM 1 (melting point: 37° C.) | | | | 50 | | |
| EOM (melting point: 55° C.) | | | | | | |
| EPM 1 (ethylene content: 51.0% by mass) | | | | | 80 | 50 |
| EPM 2 (ethylene content: 54.5% by mass) | | 100 | | | | |
| EPM 3 (ethylene content: 65.0% by mass) | | | 100 | | | |
| EPDM 1 (diene content: 0.8% by mass) | | | | | | |
| EPDM 2 (diene content: 9.5% by mass) | | | | | | |
| EPDM 3 (diene content: 4.3% by mass) | | | | 50 | 20 | 50 |
| Diene amount in rubber (wt. %) | | 0 | 0 | 2.2 | 0.9 | 2.2 |
| Carbon black | | ← | ← | ← | ← | ← |
| Zinc oxide | | ← | ← | ← | ← | ← |
| Stearic acid | | ← | ← | ← | ← | ← |
| Antiaging agent | | ← | ← | ← | ← | ← |
| Oil | | ← | ← | ← | ← | ← |
| Softener | | ← | ← | ← | ← | ← |
| Crosslinking agent | | ← | ← | ← | ← | ← |
| Physical properties in normal state | Hs | A | A | A | A | A |
| | TB | A | A | A | A | A |
| | EB | A | A | A | A | A |
| Physical properties after aging | Hs | A | A | A | A | A |
| (after 180° C. × 168 hr) | TB | B | B | A | B | A |
| | EB | A | A | B | A | B |
| Difference between physical | ΔHs | A | A | A | B | B |
| properties in normal state and after | ΔTB | B | B | A | A | A |
| aging (after 180° C. × 168 hr) | ΔEB | B | B | B | B | B |

TABLE 1-continued

| | | | | | |
|---|---|---|---|---|---|
| Wear resistance (before heat aging resistance test) | A | A | A | B | B |
| Wear resistance after 180° C. × 168 hr | A | A | A | B | B |
| Workability | Good | Poor | Excellent | Excellent | Good |

Details of the components described in Table 1 are as follows.
- EBM 1: ethylene-1-butene copolymer having a melting point of 37° C.; trade name: Engage HM7487 (manufactured by The Dow Chemical Company); density: 0.86 g/cm$^3$
- EOM: ethylene-1-octene copolymer having a melting point of 55° C.; trade name: Engage 8842 (manufactured by The Dow Chemical Company)
- EPM 1: trade name: EPT0045 having an ethylene content of 51.0% by mass (manufactured by Mitsui Chemicals, Inc.)
- EPM 2: trade name: VISTALON 503 having an ethylene content of 54.5% by mass (manufactured by Exxon Mobil Chemical)
- EPM 3: trade name: VISTALON 706 having an ethylene content of 65.0% by mass (manufactured by Exxon Mobil Chemical)
- EPDM 1: ethylene-propylene-5-ethylidene-2-norbornene copolymer having a diene content of 0.8% by mass; trade name: EP G2050 (manufactured by LANXESS)
- EPDM 2: ethylene-propylene-5-ethylidene-2-norbornene copolymer having a diene content of 9.5% by mass; trade name: ESPRENE 505A (manufactured by Sumitomo Chemical Co., Ltd.)
- EPDM 3: ethylene-propylene-5-ethylidene-2-norbornene copolymer having a diene content of 4.3% by mass; trade name: EP G5450 (manufactured by LANXESS)
- Carbon black: trade name: Niteron #300 (manufactured by Nippon Steel Chemical Carbon Co. Ltd.)
- Zinc oxide: trade name: Type III zinc oxide (manufactured by Seido Chemical Industry Co., Ltd.)
- Stearic acid: trade name: stearic acid 505 (manufactured by Chiba Fatty Acid Co., Ltd.)
- Antiaging agent: trade name: NOCRAC MMB (manufactured by Ouchi Shinko Chemical Industrial Co., Ltd.)
- Oil: trade name: SUNPAR 2280 (manufactured by Japan Sun Oil Company, Ltd.)
- Softener: trade name: Lucant HC-3000X (manufactured by Mitsui Chemicals, Inc.)
- Crosslinking agent: trade name: Perkadox 14-40 (manufactured by Kayaku Akzo Corporation)

As is clear from the results shown in Table 1, Comparative Example 1 which contained no ethylene-propylene-diene copolymer exhibited poor processability although the physical properties were excellent; and the composition of Comparative Example 1 could not produce a heat-resistant conveyor belt. Comparative Example 2 which contained no ethylene-butene copolymer but contained an ethylene-octene copolymer instead exhibited poor processability; and the composition of Comparative Example 2 was not in the quality that can produce a heat-resistant conveyor belt. Comparative Examples 3 and 4 in which an ethylene-propylene polymer was blended into an ethylene-octene copolymer showed a lack of balance between the processability and the physical properties after the aging. Comparative Examples 5 to 7 which contained no ethylene-butene copolymer and no ethylene-propylene-diene copolymer but contained an ethylene-propylene copolymer instead exhibited low tensile strength after the aging and large ΔTB and ΔEB, which resulted in poor physical properties. Comparative Example 8 in which the amount of the diene units contained in an ethylene-propylene-diene copolymer exceeded 2.0% by mass per 100 parts by mass of the total of the ethylene-butene copolymer and the ethylene-propylene-diene copolymer exhibited poor physical properties after the aging. Comparative Examples 9 and 10 which contained an ethylene-propylene copolymer and an ethylene-propylene-diene copolymer exhibited poor physical properties after the aging regardless of the diene amount.

On the other hand, Working Examples 1 to 6 exhibited high elongation at break in a normal state, high elongation at break after aging, high tensile strength, and excellent physical properties while at least maintaining heat resistance and processability.

What is claimed is:

1. A rubber composition for heat-resistant conveyor belts, the rubber composition comprising:
    an ethylene-butene copolymer; and
    an ethylene-propylene-diene copolymer;
    a mass ratio of the ethylene-butene copolymer to the ethylene-propylene-diene copolymer [(ethylene-butene copolymer)/(ethylene-propylene-diene copolymer)] being from 5/95 to 95/5; and an amount of diene units in the ethylene-propylene-diene copolymer being 2.0% by mass or less per 100 parts by mass of a total of the ethylene-butene copolymer and the ethylene-propylene-diene copolymer.

2. The rubber composition for heat-resistant conveyor belts according to claim 1, wherein a melting point of the ethylene-butene copolymer is 40° C. or lower.

3. The rubber composition for heat-resistant conveyor belts according to claim 1, wherein a density (23° C.) of the ethylene-butene copolymer is from 0.83 to 0.88 g/cm$^3$.

4. A heat-resistant conveyor belt comprising the rubber composition for heat-resistant conveyor belts described in claim 1.

5. The rubber composition for heat-resistant conveyor belts according to claim 2, wherein a density (23° C.) of the ethylene-butene copolymer is from 0.83 to 0.88 g/cm$^3$.

6. A heat-resistant conveyor belt comprising the rubber composition for heat-resistant conveyor belts described in claim 5.

7. A heat-resistant conveyor belt comprising the rubber composition for heat-resistant conveyor belts described in claim 2.

8. A heat-resistant conveyor belt comprising the rubber composition for heat-resistant conveyor belts described in claim 3.

* * * * *